US006761661B1

(12) United States Patent
Korotkov et al.

(10) Patent No.: US 6,761,661 B1
(45) Date of Patent: Jul. 13, 2004

(54) GENERAL-PURPOSE MECHANICAL HOLONOMIC ELEMENT FOR A GEAR WITH VARIABLE CHANGING OF THE ROTATION MOMENT

(76) Inventors: Eduard Korotkov, 11 Parkovaya St., dom 9/35, kv. 193, Moscow 105554 (RU); Marina Korotkova, Izmailovsky Blvd., dom 67, korp. 1, kv. 153, Moscow 105077 (RU)

(*) Notice: Subject to any disclaimer, the term of this patent is extended or adjusted under 35 U.S.C. 154(b) by 0 days.

(21) Appl. No.: 10/030,985
(22) PCT Filed: Jul. 11, 2000
(86) PCT No.: PCT/RU00/00283
§ 371 (c)(1), (2), (4) Date: Apr. 29, 2002
(87) PCT Pub. No.: WO01/90601
PCT Pub. Date: Nov. 29, 2001

(51) Int. Cl.[7] .......................... F16H 48/06; F16H 37/02
(52) U.S. Cl. ....................................... 475/221; 475/207
(58) Field of Search ................................. 475/207–209, 475/218, 219, 225, 248, 329, 330, 332, 221

(56) References Cited

U.S. PATENT DOCUMENTS

| 1,361,731 A | * | 12/1920 | Irving | ......................... 475/221 |
| 4,893,525 A | * | 1/1990 | Gabor | ......................... 475/241 |
| 5,536,219 A | * | 7/1996 | Umemoto et al. | ......................... 475/225 |
| 2003/0004030 A1 | * | 1/2003 | Goo | ......................... 475/332 |

FOREIGN PATENT DOCUMENTS

| FR | 002700302 A1 | * | 7/1994 | ................. 475/221 |

* cited by examiner

Primary Examiner—Roger Pang
(74) Attorney, Agent, or Firm—McDermott, Will & Emery

(57) ABSTRACT

The invention relates to a general-purpose mechanical holonomic element for a gear with variable changing of the rotation moment and can be used for the machine tool industry, mechanical engineering and haulage. In the first variant, the general-purpose mechanical holonomic element for a gear with variable changing of the rotation moment comprises an axis mounted in such a way that it can rotate with respect to an output shaft; and an additional gear wheel interlocking with planetary pinions which are arranged on the opposite end of an input shaft is fixed to the output shaft. Two gear wheels are fixed to the input shaft in such a way that the additional wheel can be connected to planetary pinions arranged on the other end of the input shaft. The invention makes it possible to obtain a rotation frequency of the output shaft which exceeds the rotation frequency of the input shaft.

2 Claims, 4 Drawing Sheets

US 6,761,661 B1

GENERAL-PURPOSE MECHANICAL HOLONOMIC ELEMENT FOR A GEAR WITH VARIABLE CHANGING OF THE ROTATION MOMENT

FIELD OF INVENTION

The invention relates to universal holonomic transmissions with a non-stepwise change of torque and could be utilized in engineering industry, vehicles, machine-tool industry and other objects and systems wherein an automatic or forced smooth change of an output (driven) shaft rotational speed is utilized depending on its load torque with a constant or variable input (driving) shaft rotational speed. The transmission could be utilized in rolling mills, drilling rigs, for adaptation of railways to electric traction on alternating current.

BACKGROUND OF THE INVENTION

A transmission with a friction variable-speed drive disclosed in Pronin B. A., Revkov G. A. "Non-stepwise V-belt and friction transmissions". Moscow, "Mashinostroenie", 1980, p. 290, FIG. 178. (Прнин Б.А., РевковГ.А. "Г Бесступ енчатые клинор еменные и фрикци онные". М.: "передачи Машино", 1980, с. 290, строение. 178) is known.

The disadvantages of the known technical solution are as follows: great pressures onto shafts and bearings, which pressures being associated with utilizing the frictional forces to transmit a moment; a non-rigidity of the transmission characteristic; a short longevity and low efficiency due to a slippage in contact zones; limitations on power being transmitted.

A closest analogue to the proposed construction by its technical essence is a universal holonomic transmission with a non-stepwise change of torque, the transmission including: an output shaft; a shaft intended for connecting with external devices; and an input shaft coupled with the latter shaft; planetary transmission satellites are fixed on two sides relatively to the input shaft on axes mounted free on the input shaft, the satellites placed from one side of the input shaft being connected with a gear wheel fixed on an epicycle of a differential gear comprising a carrier on which axes the satellites coupling the epicycle and a sun wheel are mounted, the sun wheel being fixed on the shaft intended for connecting with external devices, and the planetary transmission satellites placed from the other side of the input shaft are kinematically connected with the output shaft (Russian Patent No 2,053,895, Int. Cl. B 60 K 17/12, 1993).

The proposed construction comprises a second differential gear connected with the first one by the planetary transmission with a defined transmission ratio.

The disadvantages of the known construction are as follows:
a necessity of a constant gear engagement both on input and output shafts, thereby substantially lowering the transmission efficiency;
an occurrence of additional transmission losses at the cost of the fact that in the direct transmission mode all tansmission members are stopped relative to their axes and each other, i.e., as if a continuous shaft is established.

However, the input shaft and the differential gear carrier rigidly placed on one shaft revolve around the sun gears and rotate with the speed few less than the drive and output shaft rotational speeds (which are equal in the direct transmission mode).

SUMMARY OF THE INVENTION

Technical problems being solved by proposed universal holonomic transmission with a non-stepwise change of torque arc:
to simplify the transmission construction due to excluding the differential gear on the output shaft;
to provide obtaining the output shaft rotational speed faster than the input shaft rotational speed, since at the moment this is obtained by utilizing one or more additional transmissions;
to provide a possibility of non-stepwise change of the gear ratios both automatically and forcedly.

The technical result in the proposed construction is obtained by creating a universal holonomic transmission with a non-stepwise change of torque, said transmission including: an output shaft; a shaft intended for connecting with external devices; and an input shaft coupled with the latter shaft; planetary transmission satellites are fixed on two sides relatively to the input shaft on axes mounted free on the input shaft, the satellites placed from one side of the input shaft being connected with a gear wheel fixed on an epicycle of a differential gear comprising a carrier on which axes the satellites coupling the epicycle and a sun wheel are mounted, the sun wheel being fixed on the shaft intended for connecting with external devices, and the planetary transmission satellites placed from the other side of the input shaft are kinematically connected with the output shaft; wherein, in accordance with the invention, the input shaft is mounted as a rotatable one relative to the output shaft, an additional gear wheel and the differential gear carrier being fixed on the output shaft, which additional gear wheel comes into engagement with the planetary transmission satellites placed from the other side of the input shaft.

Another variant of embodiment of the proposed construction is a universal holonomic transmission with a non-stepwise change of torque, the transmission including: an output shaft; a shaft intended for connecting with external devices; and an input shaft coupled with the latter shaft; planetary transmission satellites are fixed on two sides relatively to the input shaft on axes mounted free on the input shaft, the satellites placed from one side of the input shaft being connected with a gear wheel, and a differential gear having an epicycle, a carrier on which axes the satellites connecting the epicycle and a sun wheel are mounted, which differential gear is kinematically connected with the shaft intended for connecting with external devices, and the planetary transmission satellites placed from the other side of the input shaft are kinematically connected with the output shaft; wherein, in accordance with the invention, the input shaft is mounted as a rotatable one relative to the output shaft, and two gear wheels are fixed on the output shaft, one of which gear wheels, an additional one, is connected with the planetary transmission satellites placed from the other side of the input shaft, and the second wheel is the sun wheel of the differential gear, the epicycle of the differential gear being fixed on the shaft intended for connecting with external devices and the gear wheel being fixed on the carrier.

The proposed transmission is compact, has no limitations on the power being transmitted and on rotational speed.

A wide range of gear ratios obtained by the transmission allows to organize an operation mode of mechanisms in which the proposed transmission is utilized according to the characteristic of minimum fuel rates.

The proposed holonomic transmission with a non-stepwise change of torque is a progressive variable-speed drive, i.e., when utilizing it in vehicles, the following equation is true:

$M_i * \omega_1 = N_{ABC} = const$, and a change of transmission gear ratios occurs automatically and depends on vehicles dynamics and path profile, when $N_{ABC} = const$.

BRIEF DESCRIPTION OF THE DRAWINGS

The essence of the proposed holonomic transmission with a non-stepwise change of torque is explained by the following description of the construction and by drawings, in which.

Figure 1:
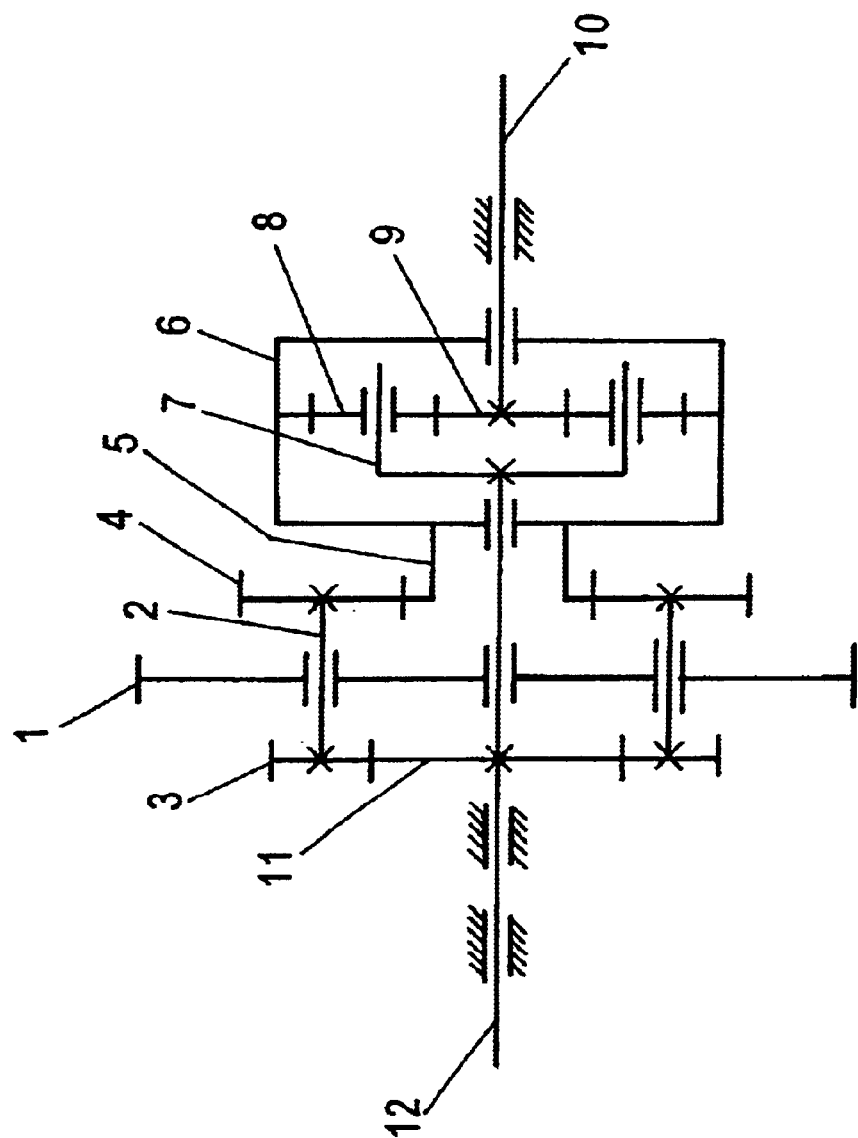
FIG. 1 shows a kinematic diagram of the proposed holonomic transmission with a non-stepwise change of torque.
Figure 2:
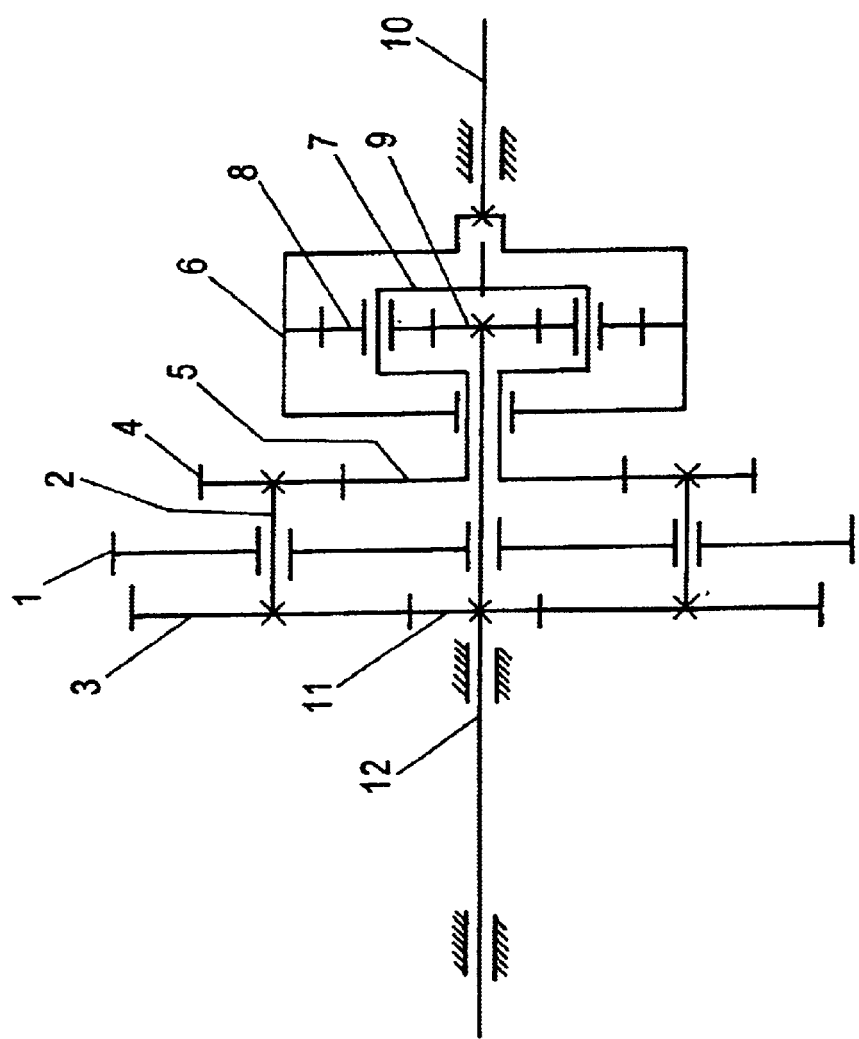
FIG. 2 shows a variant of the kinematic diagram of the proposed holonomic transmission with a non-stepwise change of torque.

PREFERRED EMBODIMENTS OF THE UNIVERSAL HOLONOMIC TRANSMISSION WITH A NON-STEPWISE CHANGE OF TORQUE

A universal holonomic transmission with a non-stepwise change of torque includes an input shaft 1 on which planetary transmission satellites 3 and 4 are fixed on two sides relative to the input shaft on axes 2 mounted free on said input shaft 1, the satellites 4 placed from one side of the shaft being connected with a gear wheel 5 fixed on an epicycle 6 of a differential gear comprising a carrier 7 on which axes are mounted satellites 8 connecting the epicycle 6 and a sun wheel 9.

The sun wheel 9 is rigidly fixed on a shaft 10 intended for connecting with external devices.

The planetary transmission satellites 3 placed from the other side of the input shaft 1 are kinematically connected with an output shaft 12 via an additional gear wheel 11.

The input shaft 1 is mounted with a possibility of independent rotation relative to the output shaft 12, and the additional gear wheel 11 and the differential gear carrier 7 are rigidly fixed on the output shaft 12.

In the second variant of embodiment of the holonomic transmission with a non-stepwise change of torque two gear wheels are rigidly fixed on the output shaft 12, one of which, the additional gear wheel 11 is connected with the planetary transmission satellites 3, and the second wheel is the sun wheel 9 of the differential gear, the epicycle 6 of the differential gear being fixed on the shaft 10 intended for connecting with external devices and the gear wheel 5 being fixed on the carrier 7.

Figure 3:
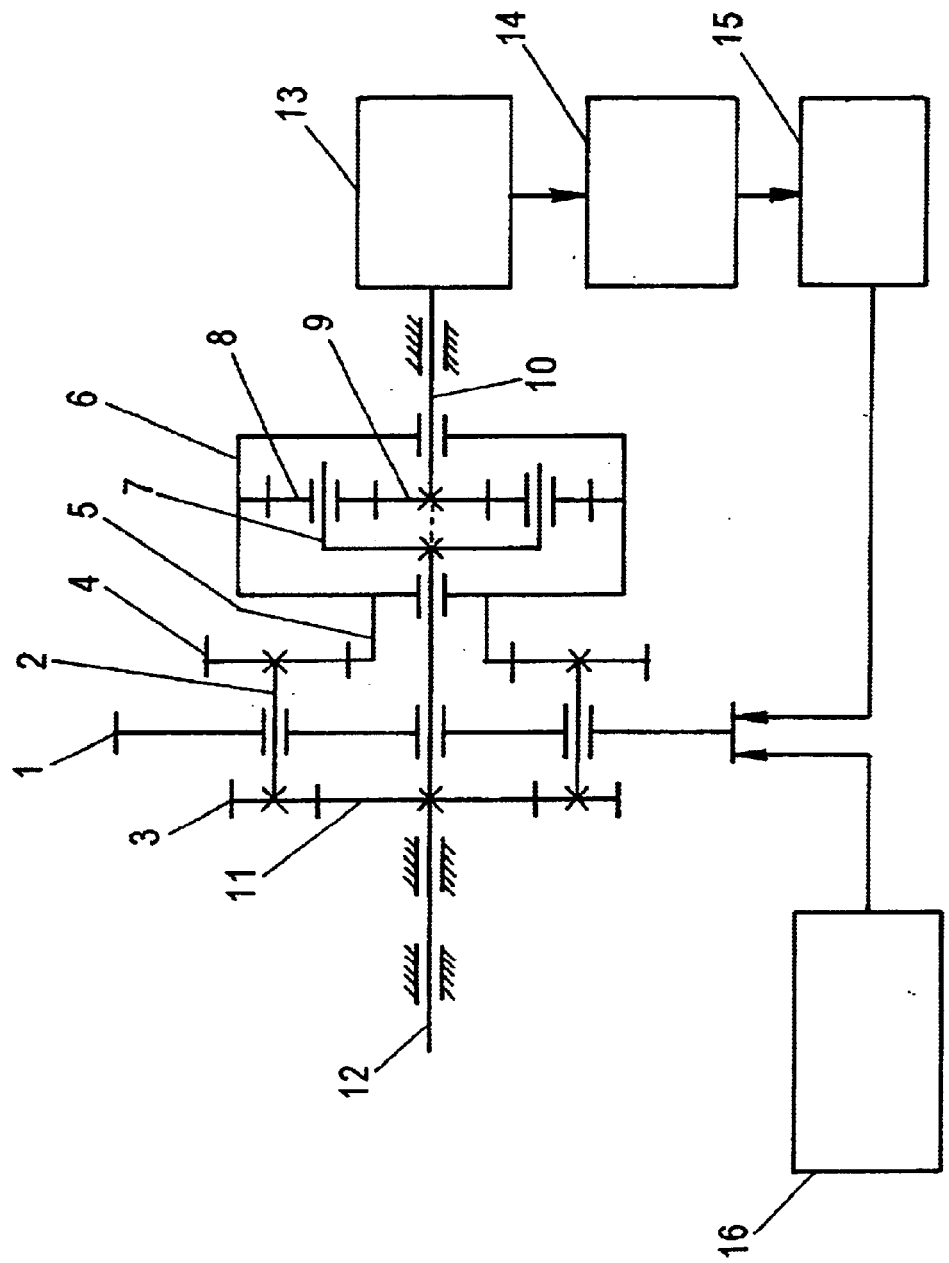
FIG. 3 shows a block diagram of a vehicle control system utilizing the proposed holonomic transmission with a non-stepwise change of torque.

The operation of the proposed holonomic transmission with a non-stepwise change of torque will be discussed by the example of its utilizing in the vehicle, a block diagram of which control system is shown in FIG. 3.

The control system includes, for example, a pump 13 connected from one side with the shaft 10, and from other side with a hydraulic motor 14, a free running coupling 15 and an internal combustion engine 16, which all interact with the input shaft 1, and a holonomic transmission with a non-stepwise change of torque.

The mechanisms used in the proposed control system are well-known, and Applicants do not claim their novelty.

The internal combustion engine 16 operates at a constant power output optimal from the fuel rate viewpoint, and minimum effluent of the harmful exhaust gases.

The constancy of the engine rotational speed is not obligatory for the system serviceability.

The required power of the pump 13 and hydraulic motor 14 in the range of great gear ratios (from 3 to ∞) must be from about 50 to 100 percent of the engine power. In the range of medium gear ratios (from 2 to 3) it must be from 25 to 50 percent, and at low gear ratios (from 1 to 2) from zero to 25 percent.

Taking into account that, when accelerating, the vehicle is in the range of great gear ratios for a very short time (1–3 sec), the required power of the pump 13 and hydraulic motor 14 should be chosen in the range of 35–50 percent of the engine power.

In the proposed holonomic transmission with a non-stepwise change of torque the gear ratios in the differential gear and planetary transmission are interrelated by a strictly determined way.

However, Applicants do not consider this ratio value as a subject-matter of the invention because it is known from the closest analogue.

In the beginning of the vehicle control system operation a rotation from the input shaft 1 is transmitted through the planetary transmission satellites 3 and 4 to the gear wheel 5 and the additional gear wheel 11, correspondingly. From the additional gear wheel 11 the rotation is transmitted to the output shaft 12.

On the other hand, the rotation from the satellite 4 is transmitted to the gear wheel 5 and, correspondingly, to the epicycle 6 of the differential gear. From the epicycle 6 via the satellites 8 the rotation is transmitted to the sun wheel 9 and further to the shaft 10 intended for connecting with the pump 13.

Thus, the rotation is transmitted to the output shaft 12, from the one hand, via the satellite 3 and additional gear wheel 11 rigidly fixed on the shaft, and from the other hand, the rotation is transmitted to the output shaft 12 from the planetary transmission satellite 4 via the gear wheel 5 and the epicycle 6, the satellites 8 of the differential gear to the carrier 7 rigidly fixed on the output shaft 12.

After starting the engine 16 (of any type and construction) the output shaft 12 is stopped, and until a counter-torque occurs on the shaft 10 intended for connecting with the pump 13 the whole block diagram of the vehicle rotates at the idle running (the pump 13 being cross-feeded). Thus, applying of the clutch is not required. The moment on the output shaft 12 is equal to zero too.

As soon as the pump 13 begins to feed the hydraulic fluid, the hydraulic motor 14 begins to rotate, and "overtaking" the engine 16 rotational speed via the free running coupling 15 it begins to rotate the input shaft with the same rotational speed as the engine does.

Thus, the power of the engine 16 is divided as though into two flows: the output shaft 12 and the pump 13. But the power coming to the pump 13 returns immediately to the input shaft 1 via the hydraulic motor 14 and free running coupling 15.

All the power developed by the engine in its any operation mode comes to the output shaft 12.

When the output shaft is stopped (the moment of vehicle movement beginning) the pump rotational speed is maximal (it can be several times greater than the engine rotational speed), the torque on the shaft 10 intended for connecting with the pump 13 is minimal, and a very great moment occurs on the output shaft 12 (up to infinity, if the engine counter-torque would allow it, which is unreal).

The vehicle movement will begin much earlier, for example, when $i_{trans}=10$.

During accelerating, as the vehicle inertial force is lowered, the torque of the output shaft 12 decreases, its rotational speed increases automatically, and the shaft 10 rotational speed decreases, decreasing correspondingly the fraction of the power transmitted through the pump 13 and hydraulic motor 14.

The process takes place automatically and non-stepwise, the gear ratio of the transmission tending to unity.

When equalizing the rotational speed of the pump 13 with the rotational speed of the engine 16, all the transmission turns into a solid shaft. All members of the system do not rotate either relatively their axes or relatively each other. The moment of the pump shaft is minimal and tends to zero, practically all the power of the engine 16 being transmitted to the output shaft 12.

If the hydraulic fluid feed from the pump 13 to the hydraulic motor 14 is shut off, then the shaft 10 stops, and the rotational speed of the output shaft 12 increases.

When i=4, this increase is about 10 percent. The transmission members rotation relatively each other will be insignificant and practically will not effect the transmission efficiency.

Figure 4:
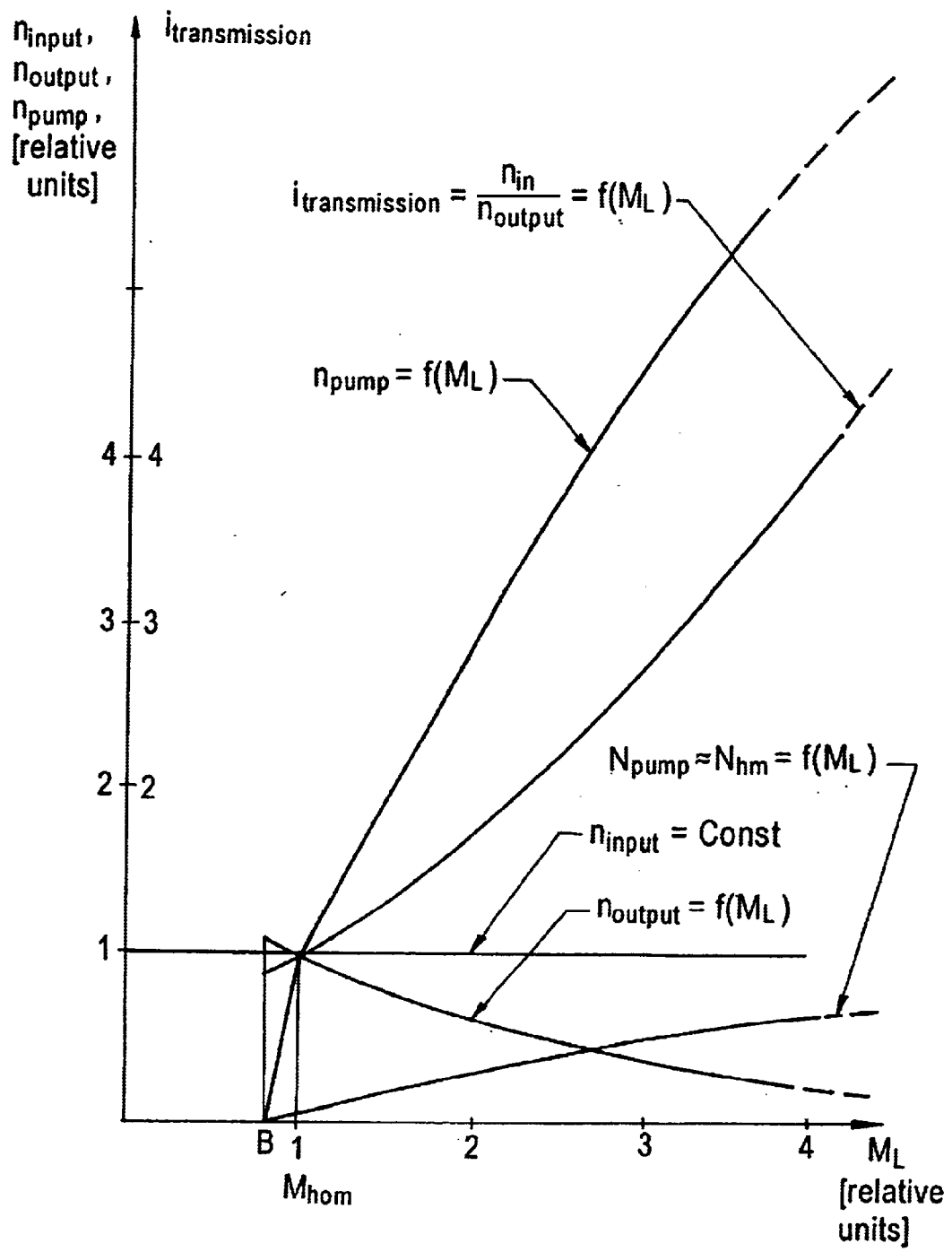
FIG. 4 shows a plot of relations between following functions: $n_{output}$, $n_{input}$, $n_{pump}$ and $i_{transmission}$ due to the load moment on the output shaft.

FIG. 4 shows the character of variations of the following fictions $n_{output}$, $n_{pump}$, and $i_{transmission}$, $N_{pump}$ (power), $N_{hm}$ (hydraulic motor power) in dependence of the load moment M on the output shaft.

The graphs are plotted in relative units on the basis of experimental data.

The point A in FIG. 4 corresponds the transmission gear ratio equal to 1. The required power of the pump in this mode is low. It returns again to the transmission output shaft through the hydraulic motor 14 and free running coupling 15.

When the pump is stopped (the hydraulic fluid feed channel is shut off), the gear ratio is 0,9 (point B). Correspondingly, the rotational speed of output shaft 12 the will increase.

The rotational speed of the output shaft 12 can be adjusted manually by the way of adjusting the hydraulic fluid feed to the hydraulic motor 14 or by the throttle (not shown) of the engine 16.

It should be noted that on the shaft 10 intended for connecting with the pump 13, a flywheel can be mounted (not shown), since the shaft rotational speed, while the output shaft 12 is stopped, is several times greater than the rotational speed of the engine 16, and then the vehicle accelerating will be performed more energetically by "double traction" at the cost of the engine power and energy stored by the flywheel in the vehicle standby position.

When braking, the output shaft is stopped and the shaft 10 picks up the maximal rotational speed, the flywheel storing the energy.

INDUSTRIAL APPLICABILITY

An operation Principle of the proposed universal holonomic transmission with a non-stepwise change of torque is proved by the operating model.

Main relations represented in FIG. 4 have been measured at that model.

The proposed universal holonomic transmission with a non-stepwise change of torque allows to simplify the vehicle control. Accelerating the vehicle with 4-step gear-box requires 19 different actions of the driver, and the proposed transmission requires only to move a hydraulic cock handle or gas pedal.

The proposed universal holonomic transmission with a non-stepwise change of torque allows to decrease the time of accelerating the vehicle for 2–2.5 times at the cost of Utilizing the engine full power and mechanical energy recuperation when braking the vehicle with the further output of the accumulated energy during accelerating.

What is claimed is:

1. A universal holonomic part of transmission with a non-stepwise change of torque, the transmission including: an output shaft (12); a shaft (10) connectable with external devices; and an input shaft (1) coupled with said shaft connectable with external devices; first and second planetary transmission satellites (3, 4) are fixed to each other on opposite sides of said input shaft and are rotatable mounted on said input shaft, the second satellites (4) being connected with a gear wheel (5) fixed on an epicycle (6) of a differential gear comprising a carrier (7) on which axes third satellites (8) coupling the epicycle (6) and a sun wheel (9) are mounted, the sun wheel (9) being fixed on the shaft (10) connectable with external devices, and the first planetary transmission satellites (3) are kinematically connected with the output shaft (12); characterized in that the input shaft (1) is counted as a rotatable relative to the output shaft (12), an additional gear wheel (11) and the differential gear carrier (7) being fixed on the output shaft (12), the additional gear wheel (11) comes into engagement with the first planetary transmission satellites (3).

2. A universal holonomic part of transmission with a non-stepwise change of torque, the transmission including: an output shaft (12); a shaft (10) connectable with external devices; and an input shaft (1) coupled with said shaft connectable with extra devices first and second planetary transmission satellites (3, 4) are fixed to each other on opposite sides of input shaft and are rotatable mounted on said input shaft, the second satellites (4) being connected with a first gear wheel (5) and a differential gear having an epicycle (6) a carrier (7) on which axes the third satellites (8) connecting the epicycle (6) and a sun wheel (9) are mounted, which differential gear is kinematically connected with the shaft (10) connectable with external devices, and the second planetary transmission satellites (4) are kinematically connected with the output shaft (12); characterized in that the input shaft (1) is mounted as a rotatable relative to the output shaft (12), and second and third gear wheels are fixed on the output shaft (12), said second gear wheel is connected with the first planetary transmission satellites (3), and the third gear wheel is a sun wheel (9) of the differential gear, the epicycle (6) of the differential gear being fixed on the shaft (10) connectable with external devices and the first gear wheel (5) being fixed on the carrier (7).

* * * * *